2,901,451
ANTISTATIC COMPOSITIONS FOR TEXTILES AND METHODS FOR PRODUCING AND APPLYING THE SAME

Dmitry M. Gagarine, Pendleton, and Henry Repokis, Clemson, S.C., assignors to Deering Milliken Research Corporation, Pendleton, S.C., a corporation of Delaware No Drawing. Application December 21, 1954
Serial No. 476,836

4 Claims. (Cl. 260—29.2)

This invention relates to compositions suitable for use in imparting antistatic properties to textile materials, to methods for preparing such compositions, to methods employing such compositions for decreasing the tendency of textiles to collect static charges and to the textiles so produced.

Many textile fabrics, and particularly fabrics made of the recently developed synthetic yarns, display a marked tendency to collect static charges. This tendency is very objectionable in that it causes, in many instances, garments made therefrom to cling to the skin of the wearer in an undesirable manner. Garments made of such materials also tend to collect lint and fly and, in some instances, to drape in an undesirable manner.

There have previously been available many antistatic compositions which could be applied to yarns or fabrics which display a tendency to collect static charges, but such compositions have in every known instance been easily removed by either washing or dry cleaning. This has limited the usefulnesses of these products primarily to manufacturing operations, since the application of such products has been too expensive and involved to be undertaken by a dry cleaning establishment or laundry each time that garments made from such fabrics are cleaned. As a result, the wearer of garments woven from materials which tend to collect static electricity has been forced to tolerate this undesirable characteristic throughout substantially the entire life of the garments.

According to this invention, there is prepared a resinous composition comprising the product of a polyester of a dicarboxylic unsaturated acid, such as maleic acid, and a polyglycol compound which composition is water soluble and can be applied to textile materials from an aqueous bath but which on exposure to air becomes cross-linked to give a resinous material insoluble in both aqueous and organic solvents. Textile materials treated with these new compositions can, therefore, be washed or dry cleaned in the usual manner without regaining their tendency to collect static charges.

In addition to being reasonably durable to both washing and dry cleaning, the new compositions of this invention have numerous other advantages for use as antistatic agents for textile materials. A first such advantage is that they can be employed from aqueous solution which makes them inexpensive to apply and makes it possible for them to be employed in mill practice with standard mill equipment and without special precautions. Another advantage of the new compositions is that they require no prolonged curing nor do they require curing at high temperatures which might injure the fabrics to which they are applied. Still a further advantage of the new compositions for use on textile materials is that they can be applied by relatively simple techniques and need be employed in such small quantities that their application is quite inexpensive.

In preparing the new compositions of this invention there may be employed any available dicarboxylic unsaturated acid having the carboxyl groups joined by an ethylenically unsaturated two-carbon chain or any dicarboxylic acid having a methylene or substituted methylene group on the carbon atom alpha to one or the other of the carboxylic groups. Such acids can be represented by the formulae:

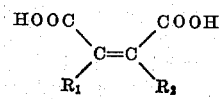

or

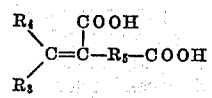

wherein $R_1$ and $R_2$ represent hydrogen or hydrocarbon groups having not more than about seven carbon atoms, $R_3$ and $R_4$ represent hydrogen or lower alkyl groups and $R_5$ represents a lower alkylene group such as —$CH_2$— and —$C_2H_4$—. Illustrative examples of acids represented by the above formulae are maleic acid, dibenzylmaleic acid, ethyl-maleic acid, fumaric acid, citraconic acid, itaconic acid and teraconic acid. In place of the free acid, one can employ any derivative thereof which is the equivalent in ester-forming reactions. For example, in place of the free acid, one can employ the corresponding anhydride if it is available, the corresponding acid chloride, or an ester of the acid formed from a lower alkyl alcohol, such as methyl alcohol, ethyl alcohol and isopropyl alcohol. Maleic anhydride is the preferred reactant since it is the most readily available and since the high molecular weight polyesters thereof are the most readily prepared.

The poly-glycol compound employed for the reaction may be any compound capable of being represented by the formula:

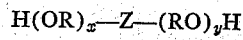

wherein R in each instance represents a lower alkylene radical such as ethylene or propylene, $x$ and $y$ represent integers, the sum of $x$ and $y$ being equal to from about 3 to 150 and preferably from about 12 to 40 and Z represents a divalent radical selected from the group consisting of

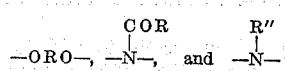

wherein R is as defined above and R' and R" are aliphatic hydrocarbon radicals having not more than about 25 carbon atoms. Best results have been achieved by employing a poly-ethylene glycol ether having an average molecular weight of from about 700 to 1200.

The ratio of acid or derivative to poly-glycol compound may vary within very wide limits depending upon the molecular weight of the poly-glycol compound and upon the reaction conditions employed. Fair results in most instances can be obtained by employing as little as one mol of dicarboxylic acid or derivative for each two mols of poly-glycol compound and on the other hand the ratio may satisfactorily be as much as 20 mols of acid or derivative for each one mol of poly-glycol compound. When employing a high ratio of acid or derivative to poly-glycol compound, it has been found that a high molecular weight polymer and a reasonably high reaction temperature should be employed since under these conditions the poly-glycol compound is believed to cleave to give a larger number of smaller components capable of satisfying the requirements for the formation of a high molecular weight polyester.

The unsaturated acid or derivative and poly-glycol compound can be reacted together at any temperature above about 100° C. so long as the reaction temperature is maintained below the point at which excessive decomposition is encountered, and satisfactory results have been achieved when employing temperatures ranging from about 110° C. to about 250° C. When employing a relatively low molecular weight poly-glycol compound, and it is desired that there be a minimum breakdown of this component of the reaction mixture, best results are generally obtained if a reaction temperature below about 200° C. is employed with the preferred range being about 140° C. to 190° C. When employing a very high molecular weight poly-glycol compound and an excess of the unsaturated acid component so that some breakup of the glycol compound is desired, a temperature of at least about 190° C. should be employed with the preferred range being from about 200 to 210° C. A greater breakup of the poly-glycol compound can be achieved by employing temperatures above 210° C. but such temperatures are not generally advantageous since, unless pressure is employed, excessive loss of reactants may be encountered.

In most instances the reaction can be readily performed by simply mixing together the ingredients and heating the resulting mixture to a suitable reaction temperature in an open vessel. It has been found that best results are generally obtained if the reaction is not conducted under such conditions that air or oxygen is completely excluded from the reaction mixture and if the reaction is conducted in an inert atmosphere, the resulting product when applied to textiles may not become as permanently affixed as might be desired. As a general rule, sufficient oxygen for satisfactory results is introduced into the reaction mixture if the reaction is conducted with moderate agitation in a vessel open to the atmosphere but, if desired, additional air can be introduced into the reaction mixture by means of a submerged tube or the like. When employing the latter procedure, however, care must be exercised that the reaction is not allowed to progress to a point where a portion of the material becomes insoluble and the reaction mixture becomes heterogeneous.

If one is employing a relatively expensive unsaturated acid or derivative, a material cost reduction may be accomplished by substituting for a portion of the unsaturated acid, a less expensive saturated dibasic acid or polyester forming derivative thereof. Phthalic anhydride, terephthalic acid and adipic acid are illustrations of compounds which give excellent results in most instances and such compounds may generally be substituted, on a molar basis, for 90% or more of the unsaturated acid with satisfactory results.

It is generally advantageous to add to the reaction mixture a dehydration catalyst, such as for example from about 0.2% to 5% based on the weight of resin, of sulfuric acid, to assist in the esterification and when employing a low reaction temperature, the addition of such a catalyst is particularly advantageous. As an alternative to the use of a catalyst, the reaction mixture can be heated until such time as the reaction is apparently completed and there can then be added approximately 1% to 10%, based upon the weight of reactants, of additional maleic acid or any other low molecular weight dicarboxylic acid as illustrated by phthalic or fumaric acid. The reaction mixture should then be heated an additional 30 minutes or so at a temperature of at least about 200° C.

For best results the reaction should be conducted until the polyester has as high a molecular weight as it is reasonably possible to obtain or until the polyester has a molecular weight of at least about 6,000. Under favorable conditions at a reaction temperature of 150° C., this generally requires from 3 to 4 hours; at a reaction temperature of 200° C., a period of about one hour is generally required; and employing a reaction temperature of 240° C. and an excess of oxygen, a satisfactory product can, under favorable conditions, be prepared in as short a time as 20 minutes. Under ordinary conditions there is little danger of conducting the reaction for too long a period but if the reaction is conducted in the presence of a large excess of air, the reaction will eventually proceed to a point where the product becomes heterogeneous and contains lumps of insoluble material. At a reaction temperature of about 200° C., this condition is reached in from about 1 to 2 hours when an excess of air is introduced into the mixture. The reaction should, for best results, be terminated just short of the point where heterogenicity is encountered so that an optimum reaction time for any given set of conditions, when employing an excess of air, can readily be determined by a test run.

In some instances a more satisfactory resin can be prepared by the addition of a polymerizable vinyl compound such as illustrated by styrene, vinyl acetate or methyl methacrylate. Such compounds are believed to react with the double bond in the unsaturated dibasic acid and, in fact, can be reacted with the acid or acid derivative before the alcoholic compound is added, although the preferred procedure comprises first reacting the dibasic acid or derivative with the poly-glycol compound and thereafter reacting the resulting polyester with the vinyl compound. The amount of the vinyl compound which may be advantageously utilized depends upon the procedure and the specific vinyl compound selected. When employing styrene or methyl methacrylate and the procedure of reacting the vinyl compound with the unsaturated polyester resin, the vinyl compound should not be employed in a quantity greater than about one mol of vinyl compound for each mol of unsaturated dibasic acid used in making the polyester resin. The use of a greater amount generally results in a water insoluble material which cannot be satisfactorily applied to textiles. On the other hand, when employing styrene or methyl methacrylate by the procedure which comprises reacting it with the unsaturated dibasic acid and then reacting the resulting product with the poly-glycol compound, up to three mols of the vinyl compound for each mol of acid or derivative can satisfactorily be employed. Vinyl acetate reacts somewhat differently than the other vinyl compounds and can be employed in amounts up to 50 or even 100% by weight of the polyester resin for reaction therewith to form a product which can be diluted with water to give a jell that can satisfactorily be employed for application to textiles. Vinyl acetate reacts only with great difficulty with the unsaturated acid or derivative before reaction with the poly-glycol compound and such a procedure is not generally advantageously employed.

While the polyester resin product can be applied to textile materials in any desired manner, it is an advantage that standard padding techniques can be employed. A padding bath containing from about 0.2% to about 20% and preferably from about 0.5% to 5% by weight of the polyester product is prepared, the textile material immersed in the bath and thereafter passed through a pair of squeeze rolls or the like in the customary manner to remove excess liquid. The pickup of liquid should be adjusted so that the amount of polyester product deposited on the textile material is equal to from about 0.2% to 10% by weight and preferably from about 0.8% to 5% by weight of the fabric. On materials dyed with certain types of dyes, a large amount of the polyester product results in an increased tendency to bleed in solvents so that it is generally advisable, for this as well as other reasons, to employ as little of the polyester material as is necessary to accomplish the desired results. After passage through squeeze rolls to remove excess moisture, the textile material is dried at any suitable temperature for example from 50° C. to 250° C., and thereafter preferably allowed to age in the open atmosphere for about one to 10 days.

Setting of the resin to an insoluble state can be accomplished more rapidly by the addition to the bath from which the polyester product is applied, of a small quantity, for example 0.1% to 20% and preferably 1% to 3% based upon the weight of resin, of a vinyl polymerization catalyst. Such compounds are generally oxidizing agents such as illustrated by potassium persulfate, potassium perborate and sodium hypochlorite. The addition of a polymerization catalyst of this type is particularly advantageous when the polyester material is applied to fabrics which are to be subjected to harsh washing since the addition of a catalyst noticeably increases the ability of the fabric to withstand such treatment without loss of its antistatic properties. If, however, the fabric is of the type which will be subjected only to dry cleaning, the addition of a catalyst of the above type is generally not advantageous since, for reasons unknown, it appears to slightly decrease the ability of the fabric to withstand repeated subjection to organic solvents without the loss of its antistatic properties.

It has also been found that the addition to the padding bath of various other agents in some instances increases the ability of the treated fabrics to withstand washing. For example, the addition of from about 1% to about 100% and preferably from about 5% to 20% based upon the weight of resin, of a water soluble quaternary ammonium compound will, when using a sodium hypochlorite catalyst, noticeably increase the ability of the treated fabrics to withstand repeated washings, but when employing a potassium persulfate catalyst, the addition of a guaternary ammonium compound is not quite so advantageous. The quaternary ammonium compounds which have been found to be of the greatest value are those capable of being represented by the formula:

wherein A represents an anion and $R_1$, $R_2$, $R_3$ and $R_4$ represent aliphatic hydrocarbon or aralkyl groups, at least one of which is a long chain aliphatic hydrocarbon radical having from about 10 to 25 carbon atoms. More than one of the radicals may, if desired, be a long chain aliphatic group but, as a general rule, compounds are preferred wherein only one of the radicals is a long chain aliphatic radical and the remaining three of the substituent groups are either lower alkyl radicals such as methyl, ethyl, and propyl or aralkyl groups such as benzyl. The nature of the anion may vary widely as long as the quaternary ammonium compound remains water soluble and "A" may suitably represent ions such as chlorine or other halide ions, hydroxide, sulfite, nitrate, acetate and other common anions. The chlorides are preferred because of availability. Illustrative examples of preferred compounds are octadecyl trimethyl ammonium chloride, hexadecyl trimethyl ammonium chloride, and dimethyl benzyl actadecyl ammonium chloride. Thus quaternary ammonium compound can be added to the padding bath or, as an alternative, it can be applied to the fabric prior to the application of the polyester material.

It has also been found that the addition to the padding bath of from about 0.1% to about 3% and preferably from about 0.1% to 1%, based on the weight of the bath, of boric acid also increases the ability of the treated fabrics to withstand washing regardless of whether or not a quaternary ammonium compound is employed. Therefore, to obtain maximum resistance to washing one should employ not only a vinyl polymerization catalyst but should also employ a small amount of a quaternary ammonium compound and a small amount of boric acid in the bath from which the polyester resin product is applied.

The invention will now be illustrated by the following specific examples in which all part are by weight unless otherwise indicated:

*Example I*

In a suitable reaction vessel there is placed 1,000 parts by weight of a polyethylene glycol ether having an average molecular weight of from 950 to 1,050 (Carbowax 1,000), 100 parts by weight of maleic anhydride and 5 parts by weight of sulfuric acid. The resulting mixture is heated to a temperature of 200° C. and retained at this temperature for 1½ hours, with constant stirring, to give approximately 1,000 parts by weight of a light brown viscous liquid which solidifies at about 25° C. The product has an iodine number of from 0 to 2 and molecular weight determinations indicate a molecular weight of about 6,000.

Four parts by weight of the resinous material prepared above are dissolved in 200 parts by weight of water and the resulting solution is employed for treating a fabric woven of 100% Dacron polyethylene terephthalate fibers. The Dacron fabric is passed through the solution and thereafter through a pair of rolls at 5 tons pressure to result in a liquid pick-up of approximately 65%. The fabric is then dried on a tenter frame at 250° F. with an exposure of 25 seconds. The thus treated fabric has good antistatic properties which become durable to dry cleaning and mild washing after about 10 days' ageing.

In place of the maleic anhydride employed in the above example, one can, with satisfactory results substitute and equal molar quantity of dibenzyl maleic acid, fumaric acid, citraconic acid, maleic acid chloride, or the dimethyl ester of maleic acid. Likewise one can, with satisfactory results, substitute for the poly-ethylene glycol ether employed above an equal molar quantity of a poly-ethylene glycol ether having an aveargemolecular weight of 500 to 600 and sold under the mark "Carbowax 1500x," an equal molar quantity of a poly-ethylene glycol ether having an average molecular weight of 6000 to 7500 and sold under the mark "Carbowax 6000," or an equal molar quantity of a propylene glycol either having an average molecular weight of 400–450 and available under the trade name of "Polypropylene Glycol 425." The poly-ethylene compound employed in the above example is preferred, however, and gives the most satisfactory results of any yet employed.

*Example II*

A fabric comprising 55% Dacron and 45% wool is dyed in a conventional manner except that 2%, based on the weight of fabric, of trimethyl octadecyl ammonium chloride is included in the last rinse and partially exhausted onto the fabric. The fabric is then dried, singed and passed through an aqueous solution containing 2%, based upon the weight of solution, of the liquid reaction product prepared in Example I, 0.25% of a 5.5% solution of sodium hypochlorite and 1% butanol. The fabric is then dried and finished in the usual manner and is found to have excellent antistatic properties which are permanent to mild washing after 1 to 2 days' ageing.

*Example III*

Eight parts by weight of the polyester reaction product of Example I are dissolved in 80 parts by weight of water and to the resulting mixture there is added 10 parts by weight of a 7% potassium persulfate solution. The resulting mixture is heated with stirring to 180° F. and held at this temperature for 20 minutes at the end of which time approximately 300 parts by weight of cold water are added. Samples of a Dacron fabric and a Dacron-wool fabric are padded through the diluted solution, squeezed to give a pick-up of approximately 75% and dried for 20 minutes at 250° F. The resulting fabrics are found to possess excellent antistatic properties durable to dry cleaning in Varsol, Perclene and to mild washing with soap and synthetic detergents.

*Example IV*

In a suitable open reaction vessel there is placed 4,000 parts by weight of a polyethylene glycol compound having an average molecular weight of 3,000 to 3,700 (Carbowax 4,000), 200 parts by weight of maleic anhydride and 20 parts by weight of sulfuric acid. The resulting mixture is melted and heated to a temperature of 230° C. for 1½ hours with constant agitation. The resulting polyester product is a viscous liquid which does not solidify on cooling to room temperature and which has an iodine number less than 2. On exposure to air the resin forms a film which is insoluble in water and organic solvents.

Eight parts by weight of the above poleyster product are dissolved in approximately 800 parts of water and the resulting solution is employed to treat a 100% nylon fabric. The nylon fabric is padded through the solution and thereafter through a pair of squeeze rolls to give a pick-up of approximately 45% and is then dried on a tenter frame at 250° F. with a 45 second exposure. The resulting fabric has excellent antistatic properties which become reasonably permanent to dry cleaning after ageing for a period of about 8 days.

*Example V*

Eight parts by weight of the polyester material of Example I are dissolved in 400 parts by weight of water and to the resulting solution there is added 0.4 part by weight of benzyl dimethyl octadecyl ammonium chloride and 10 parts by weight of a 5.5% solution of sodium hypochlorite. A 4 ounce fabric woven from spun polyester yarns (Dacron) is padded through the resulting solution and then through squeeze rolls to give a pickup of approximately 65% by weight. The fabric is then dried at 200° F. and aged 8 days at room temperature. The thus treated fabric has excellent antistatic properties before washing and withstands washing appreciably better than fabric treated according to Example I.

In place of the benzyl dimethyl octadecyl ammonium chloride employed in the above example, an equal molar quantity of other quaternary ammonium compounds having at least one long aliphatic chain may be employed with satisfactory results. For example, in place of the quaternary ammonium compound employed above, one can employ with excellent results an equal molar quantity of octadecyl trimethyl ammonium chloride, hexadecyl trimethyl ammonium chloride, dibenzyl methyl octadecyl ammonium chloride, trimethyl oleyl ammonium chloride [CH$_3$(CH$_2$)$_7$CH=CH(CH$_2$)$_8$](CH$_3$)$_3$NCl, or dioleyl dimethyl ammonium hydroxide.

*Example VI*

Ten parts by weight of the polyester material of Example I, 2 parts by weight of potassium persulfate and 5 parts by weight of boric acid are added to 100 parts of water, the resulting mixture heated for 30 minutes at 190° F. and then diluted to 1000 parts with cold water. A polyester (Dacron) fabric is padded through the resulting solution, passed through squeeze rolls to give a liquid pick-up of approximately 70% and thereafter dried at 200° F. and stored for 7 days at room temperature. The antistatic properties of the thus treated fabric are initially as good as those of the fabric of Example I and after 5 washings with a sodium soap, the antistatic properties of fabric of this example are noticeably superior to the antistatic properties of a sample of similarly washed fabric as prepared according to Example I.

*Example VII*

In a suitable reaction vessel there is placed 940 parts by weight of a disubstituted derivative of stearyl amine represented by the formula

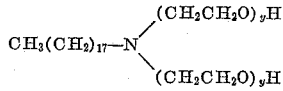

wherein the sum of $x$ and $y$ equal an average of 15 (Ethomeen 18/25), 116 parts by weight of maleic anhydride and 5 parts by weight of sulfuric acid. The resulting mixture is heated to a temperature of 200° C. and retained at this temperature for one and one-half hours, with constant stirring, to give a dark colored liquid polyester product.

Two parts by weight of the above polyester product are dissolved in 200 parts by weight of water and the resulting solution is placed in a pad box. A fabric woven from 100% acrylic (Orlon 42) fiber is padded through the resulting solution and then through squeeze rolls to give a liquid pick-up of approximately 80%. The fabric is then dried at 250° F. and stored at room temperature for 6 days. The resulting fabric displays excellent antistatic properties which are reasonably permanent to dry cleaning and mild washing with cationic and nonionic surface active agents.

In place of the amine compound employed above, one can, with similar results, substitute an equal molar quantity of a material sold under the name of "Ethomeen S/25" which is a derivative of soybean amine with 15 mols of ethylene oxide, a material sold under the name of "Ethomeen C15" which is a derivative of coco amine with 5 mols of ethylene oxide, or a material sold under the name "Ethomeen 18/60" which is a derivative of stearyl amine with 50 mols of ethylene oxide.

*Example VIII*

Example VII is repeated except that in place of the substituted amine compound, there is employed 950 parts of a disubstituted derivative of oleic amide represented by the formula:

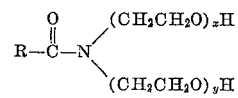

wherein R repersents the residue of oleic acid and $x$ and $y$ represent integers, the average sum of which is 15 (Ethomid RO/25). Fabric treated with the resulting polyester material by the procedure of Example VII retains its antistatic properties after dry cleaning and mild washing with soap and detergents.

In place of the amide employed above one can employ an equal molar quantity of a material sold under the name of "Ethomid C20" which is a derivative of coco amide and 10 mols of ethylene oxide, or a product sold under the name of Ethomid C60 which is a derivative of coco amide and 50 mols of ethylene oxide.

*Example IX*

In a suitable reaction vessel there is placed 1000 parts by weight of a polyethylene glycol ether having an average molecular weight of 950–1050 (Carbowax 1000), 133 parts by weight of phthalic anhydride, 13 parts by weight of itaconic acid, and 5 parts by weight of sulfuric acid. The resulting mixture is heated to a temperature of 150° C. and retained at this temperature for 3 hours with constant agitation to give approximately 1000 parts by weight of a dark brown polyester product.

Three parts by weight of the above polyester product are dissolved in 200 parts by weight of water and the resulting solution is employed for the impregnation of a fabric woven from 100% polyester (Dacron) fabrics under such conditions that approximately 1% resin is deposited on the fabric. The fabric is then dried on a tenter frame at 250° F. with an exposure of 25 seconds. The thus treated fabric is found to have good initial antistatic properties which after ageing for 10 days become reasonably durable to dry cleaning and mild washing.

In place of the itaconic acid employed in the above example, one can employ an equal molar quantity of teraconic acid with satisfactory results. Likewise in place of the phthalic anhydride employed above one can employ any other polymer forming dibasic acid or derivative which is less expensive than the unsaturated acid necessary for good film forming characteristics. Examples of other compounds which are readily available and which may be substituted for the phthalic anhydride employed above include terephthalic acid and adipic acid.

Example X

In a suitable reaction vessel equipped with a reflux condenser there is placed 100 parts of the polyester product of Example I and 5 parts of monomeric styrene and the mixture is heated under reflux at 170° C. for 30 minutes. The resulting product is a water soluble resin which forms a tough pliable film on exposure to air.

Eight parts of the above resin are dissolved in 400 parts of water and a fabric composed of 55% acrylic fibers (Orlon) and 45% wool fibers is padded through the solution and thereafter through squeeze rolls to remove excess liquid and to result in a pick up of approximately 85%. The resulting fabric is dried at 240° F. and found to possess excellent antistatic properties which become permanent to dry cleaning and mild washing after eight days ageing at room temperature.

A vinyl polymerization catalyst such as, for example, 2 parts by weight of potassium persulfate, can be added to the solution of the resin before it is padded on the fabric if increased durability to washing is desired.

In place of the polyester resin employed above there can be substituted, with satisfactory results, an equal weight of the polyester material prepared in Example VII or the polyester material prepared in Example VIII.

Example XI

In a suitable reaction vessel equipped with a reflux condenser there is placed 20 parts by weight of the polyester resin of Example I dissolved in 80 parts by weight of water, 10 parts by weight of vinyl acetate monomer and 3 parts of a 40% solution of hydrogen peroxide. The resulting mixture is heated under reflux at 60° C. with occasional stirring until jell formation occurs (approximately 3 days) at the end of which time the heating is terminated. The reaction mixture is allowed to cool and the product is then removed and ground to a finely divided state.

Four parts by weight of the finely divided material are added to 200 parts of water and the resulting mixture stirred for 48 hours. At the end of this time the mixture shows the properties of a jell but can be satisfactorily padded on to a fabric. A 100% polyester Dacron fabric is padded through the mixture to result in there being deposited on the fabric approximately 2%, by weight of the fabric, of solids and the fabric is thereafter dried at a temperature of 220° F. and allowed to age at room temperature for 8 days. The thus treated fabric displays excellent antistatic properties which are reasonably durable to dry cleaning and washing.

Example XII

In a suitable reaction vessel equipped with a reflux condenser there is placed 150 parts of maleic anhydride, 150 parts of styrene, 3 parts of bezoyl peroxide and 700 parts of acetone. The resulting mixture is refluxed until a sample upon evaporation of the solvent analyzes 30% solids (approximately 24 hours) during which time moisture is excluded by means of a calcium chloride trap. There is then added 3000 parts of a polyethylene glycol ether having an average molecular weight of about 1000 (Carbowax 1000). If desired, 5 parts by weight of sulfuric acid can also be added although this is not necessary. The resulting mixture is then heated and the acetone solvent allowed to vaporize into a condenser from which it is collected for future use. The temperature of the reaction mixture is then raised to 160° and retained at this point until bubbles arising from the bottom of the vessel display an angular tail or until a sample of the material displays a marked decrease in water solubility. If the heating is carried too far, an insoluble jell will form and the optimum point for termination of the reaction is immediately preceding jell formation.

Eight parts by weight of the above reaction product are dissolved in 400 parts by weight of water and the resulting solution placed in a pad box. A fabric composed of 100% polyester fibers (Dacron) is padded through the solution to give a pick up of approximately 80% and is thereafter dried at 250° C. and aged for 6 days at room temperature. The thus treated fabric displays excellent antistatic properties which are reasonably permanent to washing and dry cleaning.

In place of the polyethylene glycol ether employed in the above example, an equal molar quantity of the substituted amide compound of Example VII or the substituted amine compound of Example 8 can be employed with satisfactory results. Likewise, in place of the styrene employed above an equal molar quantity of methyl methacrylate may be substituted. Quaternary ammonium compounds, such as previously described, or a vinyl polymerization catalyst can be added to the padding bath to increase the durability of the antistatic agent to washing, although in this instance the addition of a vinyl polymerization catalyst does not give the degree of improvement experienced in the procedure of Example V.

Example XIII

In a suitable reaction vessel there is placed 200 parts by weight of a poly-ethylene glycol ether having an average molecular weight of from about 950 to 1050 (Carbowex 1000), 30 parts by weight of phthalic anhydride and 2 parts by weight of sulfuric acid. The mixture is heated for approximately one hour at 200° C. at the end of which time there is added 10 parts by weight of maleic anhydride and the reaction mixture is thereafter retained at 200° for at least an additional 30 minutes. During this period an analysis of the fumes arising from the reaction mixture shows the presence of water, glycol, paraldehyde and formaldehyde so that inhalation of the fumes should be avoided. The product is completely soluble in dilute ammonium hydroxide and can be precipitated from basic solutions by the addition of an acid.

A 1000 parts by weight sample of a fabric composed of 45% wool fibers and 55% polyester (Dacron) fibers is placed in a dolly washer containing 20,000 parts by weight of water at 80° F. With the dolly washer in operation, there is gradually added a solution prepared by dispersing 30 parts of the polyester product above in 250 parts of water and thereafter adjusting the pH to 9.0 with ammonium hydroxide. After the resin solution has had an opportunity to become evenly distributed in the bath, there is gradually added dilute sulfuric acid until the pH of the bath is reduced to about 5. This results in the precipitation of the resin in the form of small dispersed particles having a size of from about 0.5 to 15 microns. Operation of the washer is continued until the small particles are almost completely deposited on the fabric and the bath is clear and no resinous material is salted out by the addition of sodium sulfate to a small sample of the bath. The fabric is then removed, passed through a pair of rolls to remove excess moisture and dried at 100° C. The thus treated fabric displays good antistatic properties which become reasonably permanent to dry cleaning and mild washing after approximately 5 days.

In the procedure illustrated in the above example, dehydration catalyst (sulfuric acid, dodecylbenzene sulfonic acid or the like) concentration during the preparation of the polyester material appears to be one of the controlling factors in so far as the insolubility of the resin is concerned. If a resin is desired which is partially insoluble in neutral aqueous solution, no less than about 0.5% catalyst should be employed when the ratio of maleic acid to phthalic acid is as in the above example, but, on the other hand, the more catalyst that is employed, the lower the yield of polyester product. Under the conditions as described above, a test run with about 0.5% sulfuric acid, based on the total weight of reactants, gave an 80% yield; a test with about 1% sulfuric acid gave a 65% yield; and a test with about 2% sulfuric acid resulted in a yield of the polyester product equal to only 30% of the theoretical. Under any conditions is it seldom advantageous to employ less than about 0.3% or more than about 5% catalyst and as a general rule, considering both the quality of the product and the yield, best results are obtained when about 1% sulfuric acid, or an equivalent amount of other dehydration catalyst, is employed.

A second important factor influencing the insolubility of the product in neutral solution is the ratio of phthalic acid or derivative to maleic acid or derivative. To obtain a satisfactory degree of insolubility, the weight of phthalic acid compound should be equal to at least about 80% of the weight of the maleic acid compound and preferably at least equal to the weight of maleic acid compound. On the other hand, the weight of phthalic acid compound should not be more than about 10 and preferably not more than about 6 times the weight of the maleic acid compound, since, as previously pointed out, if one attempts to employ too little of the unsaturated acid, the resulting polyester resin does not have the desired properies.

The procedure illustrated in the last example above has the surprising advantage that relatively large amounts of the resin can be applied without increasing the tendency of the fabric to bleed in solvents when it is dyed with certain dyestuffs. Some dyestuffs and particularly a frequently employed dyestuff sold under the trade name of Latyl Violet, display a tendency to bleed in the presence of solvents and as previously mentioned, the polyester resins of this invention under ordinary circumstances frequently tend to intensify this condition. The exact reason that resins prepared and applied according to this example do not have a similar effect is not known but is believed to be due to the fact that the resin contains a small percentage of maleic acid and to the fact that the smaller components of the resin are left in solution and are not precipitated by the addition of an acid. It is well established, however, that for whatever may be the reason, the procedure of this example has a definite advantage for use with fabrics dyed with colors which are known to be subject to solvent bleeding.

Having thus described our invention, what we claim and desire to secure by Letters Patent is:

1. An aqueous solution for use in treating textile materials to impart a durable antistatic finish thereto comprising between about 0.2 and 20% by weight of a water-soluble polyester resin formed by heating together, in the presence of a dehydration catalyst and at a temperature of from 110° C., to 250° C., a polyglycol compound of the formula:

$$H(OR)_x-Z-(RO)_yH$$

wherein R in each instance represents a lower alkylene group, $x$ and $y$ represent positive integers the sum of which is about 12 to 40, and Z represents a divalent radical R″ selected from the group consisting of —ORO—, —N—, COR′ and —N—, where R is as above and R′ and R″ represent aliphatic hydrocarbon radicals having not more than about 25 carbon atoms, and from 0.5 to 20 mols for each mol of said polyglycol compound of a compound selected from the group consisting of dibasic unsaturated acids selected from the group consisting of those of the formula:

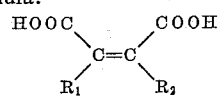

wherein $R_1$ and $R_2$ in each instance represent a member selected from the group consisting of hydrogen and hydrocarbon radicals having not more than about seven carbon atoms, and those of the formula:

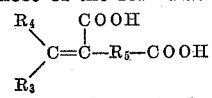

wherein $R_3$ and $R_4$ in each instance represent a member selected from the group consisting of hydrogen and lower alkyl radicals and $R_5$ represents a lower alkylene group; the acid chlorides of such acids, the anhydrides of such acids and the esters of such acids resulting from lower alkyl alcohols; said heating being conducted with continuous agitation sufficiently vigorous to prevent the formation of a surface skin and with the reaction mixture in surface contact with oxygen, and said heating being conducted at least until the resin has an average molecular weight of at least about 6000 but for an insufficient time for the reaction mixture to become noticeably heterogeneous, between about 1 and 3% by weight based on the weight of the resin of a vinyl polymerization catalyst selected from the group consisting of water soluble inorganic peroxides and sodium hypochlorite and between about 5 and 20% by weight based upon the weight of said resin of a water soluble quarternary ammonium compound having the formula:

wherein A represents an anion and $R_1$, $R_2$, $R_3$ and $R_4$ represent members selected from the group consisting of alkyl and aralkyl groups, at least one of the members $R_1$, $R_2$, $R_3$ and $R_4$ representing a long chain alkyl radical having between about 10 and 25 carbon atoms.

2. An aqueous solution for use in treating textile materials to impart a durable antistatic finish thereto comprising between about 0.2 and 20% by weight of a water soluble, oxygen-convertible polyester resin having an average molecular weight of at least about 6000 formed by reaction of a polyglycol ether of the formula:

$$HO-(CH_2-CH_2O)_nH$$

wherein $n$ represents an integer of from 12 to 40 with from 0.5 to 20 mols for each mol of said ether of a compound selected from the group consisting of dicarboxylic acids of the formula:

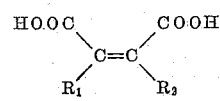

wherein $R_1$ and $R_2$ are radicals selected from the group consisting of hydrogen and hydrocarbon radicals containing not more than seven carbon atoms, the acid chlorides of such acids, the anhydrides of such acids and the lower alkyl esters of such acids, between about 1 and 3% by weight based on the weight of the resin of a vinyl polymerization catalyst selected from the group consisting of water soluble inorganic peroxides and sodium hypochlorite and between about 5 and 20% by weight based on the weight of the resin of a water soluble C10 to C25 alkyl containing quaternary ammonium halide.

3. A method of imparting a durable antistatic finish to textile materials which comprises impregnating the material with an aqueous solution as defined in claim 1 to thereby deposit on the fabric from about 0.2 to 10% by weight of said resin and then drying the impregnated material in the presence of air.

4. An aqueous solution for use in treating textile materials to impart a durable antistatic finish thereto comprising between about 0.2 and 20% by weight of a water soluble oxygen-convertible polyester resin having an average molecular weight of at least about 6000 formed by reaction of a polyethylene glycol ether having an average molecular weight of about 700 to 1200 with from 0.5 to 20 mols of maleic anhydride for each mol of said ether, between about 1 and 3% by weight based on the weight of the resin of a vinyl polymerization catalyst selected from the group consisting of water soluble inorganic peroxides and sodium hypochlorite and between about 5 and 20% by weight based on the weight of the resin of a water soluble mono-C10 to C25-alkyl tri-lower alkyl ammonium halide.

References Cited in the file of this patent

UNITED STATES PATENTS

| | | |
|---|---|---|
| 2,166,542 | Bradley | July 18, 1939 |
| 2,195,362 | Ellis | Mar. 26, 1940 |
| 2,259,225 | Kienle et al. | Oct. 14, 1941 |
| 2,276,267 | Bradley | Mar. 17, 1942 |
| 2,388,206 | Boulton et al. | Oct. 30, 1945 |
| 2,443,735 | Kropa | June 22, 1948 |
| 2,628,176 | Simon et al. | Feb. 10, 1953 |
| 2,676,896 | Cohen et al. | Apr. 27, 1954 |